US005452096A

United States Patent [19]

Ito

[11] Patent Number: 5,452,096

[45] Date of Patent: Sep. 19, 1995

[54] RECORDING/REPRODUCING APPARATUS WHEREIN THE SAME FRAME OF A VIDEO SIGNAL IS REPEATEDLY READ OUT OF A MEMORY TO PRODUCE SPECIAL EFFECTS

[75] Inventor: Yuji Ito, Kanagawa, Japan

[73] Assignee: Sony Corporation, Tokyo, Japan

[21] Appl. No.: 82,364

[22] Filed: Jun. 28, 1993

[30] Foreign Application Priority Data

Jul. 1, 1992 [JP] Japan ........................ 4-174455

[51] Int. Cl.[6] ........................ H04N 5/76

[52] U.S. Cl. ........................ 358/311; 358/312; 358/335; 360/13; 360/14.2; 360/14.3

[58] Field of Search ........................ 358/335, 310, 311, 312, 358/313; 360/13, 14.1, 14.2, 14.3, 33.1, 35.1; H04N 5/76

[56] References Cited

U.S. PATENT DOCUMENTS 4,134,130 1/1979 Tachi ........................ 360/14.3
4,520,401 3/1985 Takahashi et al. ........................ 358/310
4,612,569 9/1986 Ichinose ........................ 358/311
4,999,719 3/1991 Tozaki et al. ........................ 360/35.1

*Primary Examiner*—Tommy P. Chin
*Assistant Examiner*—Khoi Truong
*Attorney, Agent, or Firm*—Jay H. Maioli

[57] ABSTRACT

Apparatus for recording or reproducing a video signal has a user-controlled starting point setting device enabling a user of the apparatus to set a time code representative of a recording starting point. A user-controlled frame number setting device enables the user to set the number of frames to be recorded. A frame memory records an arbitrary one frame of an input video signal. A controller calculates a time code representative of a recording ending point on the basis of the time code of the starting point set by the user and the number of frames set by the user and controls the frame memory so that the video signal written in the frame memory is repeatedly read out and recorded during a period from the recording starting point to the recording ending point.

6 Claims, 2 Drawing Sheets

VTR Recording and Reproducing System
OUT2
IN2
OUT1
IN1
OUT3
IN3
Frame Memory
OUT
IN
Signal Processor
Back Color Signal Generator
Time Code Generating/ Reading Ckt.
System Controller (CPU)
Operation Unit
UP
DOWN
EN
Memory
Display Unit
H
M
S
F FIG. 2A
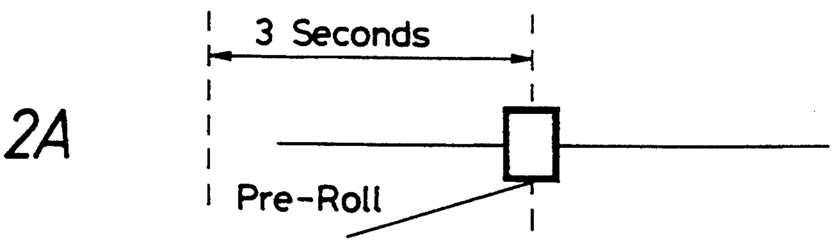
FIG. 2B
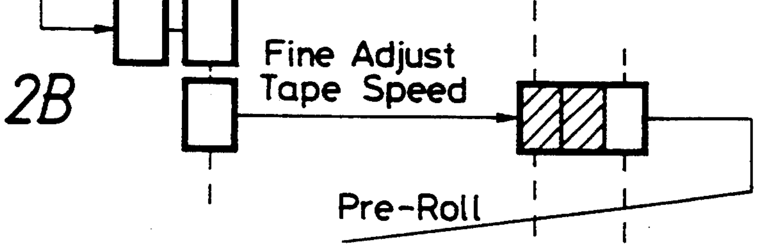
FIG. 2C
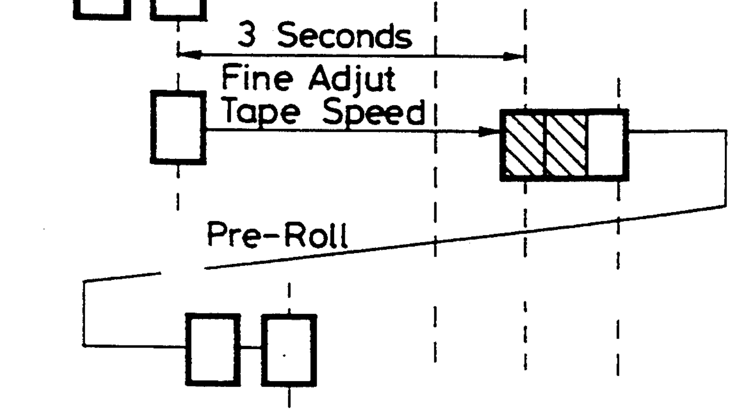
FIG. 2D
FIG. 2E
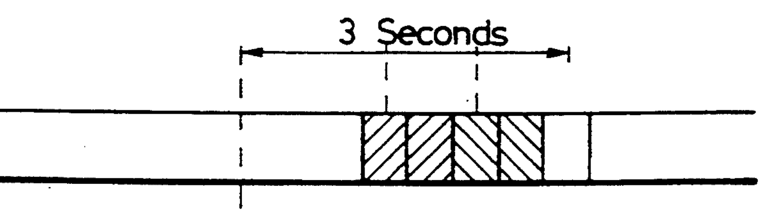

RECORDING/REPRODUCING APPARATUS WHEREIN THE SAME FRAME OF A VIDEO SIGNAL IS REPEATEDLY READ OUT OF A MEMORY TO PRODUCE SPECIAL EFFECTS

BACKGROUND OF THE INVENTION

1. Field of the Invention

The present invention relates to a video tape recorder (VTR) for processing a recording and/or reproducing video signal by using a frame memory and a time code.

2. Description of the Related Art

When a so-called animation is made by recording, for example, a still picture of an arbitrary frame, a video signal of one frame each is edited by using a very expensive control apparatus or special video tape recorder (VTR) or by using an editing apparatus, which needs a lot of money, time and work.

Further, there is known an apparatus in which a reproducing system of a video tape recorder includes a frame memory to effect a so-called noiseless-slow playback or to reproduce a still picture, Such apparatus is, however, used in limited ways and cannot process a recording and/or reproducing video signal arbitrarily.

OBJECTS AND SUMMARY OF THE INVENTION

Therefore, it is a general object of the present invention to provide an improved apparatus for recording a video signal in which the aforesaid shortcomings and disadvantages encountered with the prior art can be eliminated.

More specifically, it is an object of the present invention to provide an apparatus for recording a video signal wherein upon recording and reproducing an arbitrary video signal processing such as an animation or the like can be carried out by using a frame memory and a time code.

According to a first aspect of the present invention, there is provided an apparatus for recording a video signal which comprises a starting point setting circuit for setting a time code representative of a recording starting point, a frame number setting circuit for setting the number of frames to be recorded, a frame memory in which an arbitrary one frame of an input video signal is recorded, and a control circuit for calculating a time code representative of a recording ending point on the basis of the time code of the starting point and the number of frames and controlling the frame memory so that the video signal written in the frame memory is repeatedly read out and recorded during a period from the recording starting point to the recording ending point.

According to a second aspect of the present invention, this video signal recording apparatus further comprises a picture generating circuit for generating a video signal of an arbitrary fixed picture, a time code generating circuit for generating a time code signal and a control circuit for preformatting a recording medium by recording the video signal of fixed picture and the time code signal.

According to a third aspect of the present invention, there is provided an apparatus for reproducing a video signal which comprises a circuit for storing a plurality of arbitrary time codes, a circuit for reading time codes thus stored arbitrarily and reproducing a video signal of one frame recorded at the position of the read out time code, a frame memory in which the reproduced video signal is written, and a control circuit for controlling the frame memory so that the video signal written into the frame memory is repeatedly read out and output to an output terminal.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIGS. 2A through 2E are schematic diagrams used to explain operation of the video tape recorder shown in FIG. 1, respectively.

DETAILED DESCRIPTION OF THE PREFERRED EMBODIMENT

Figure 1:
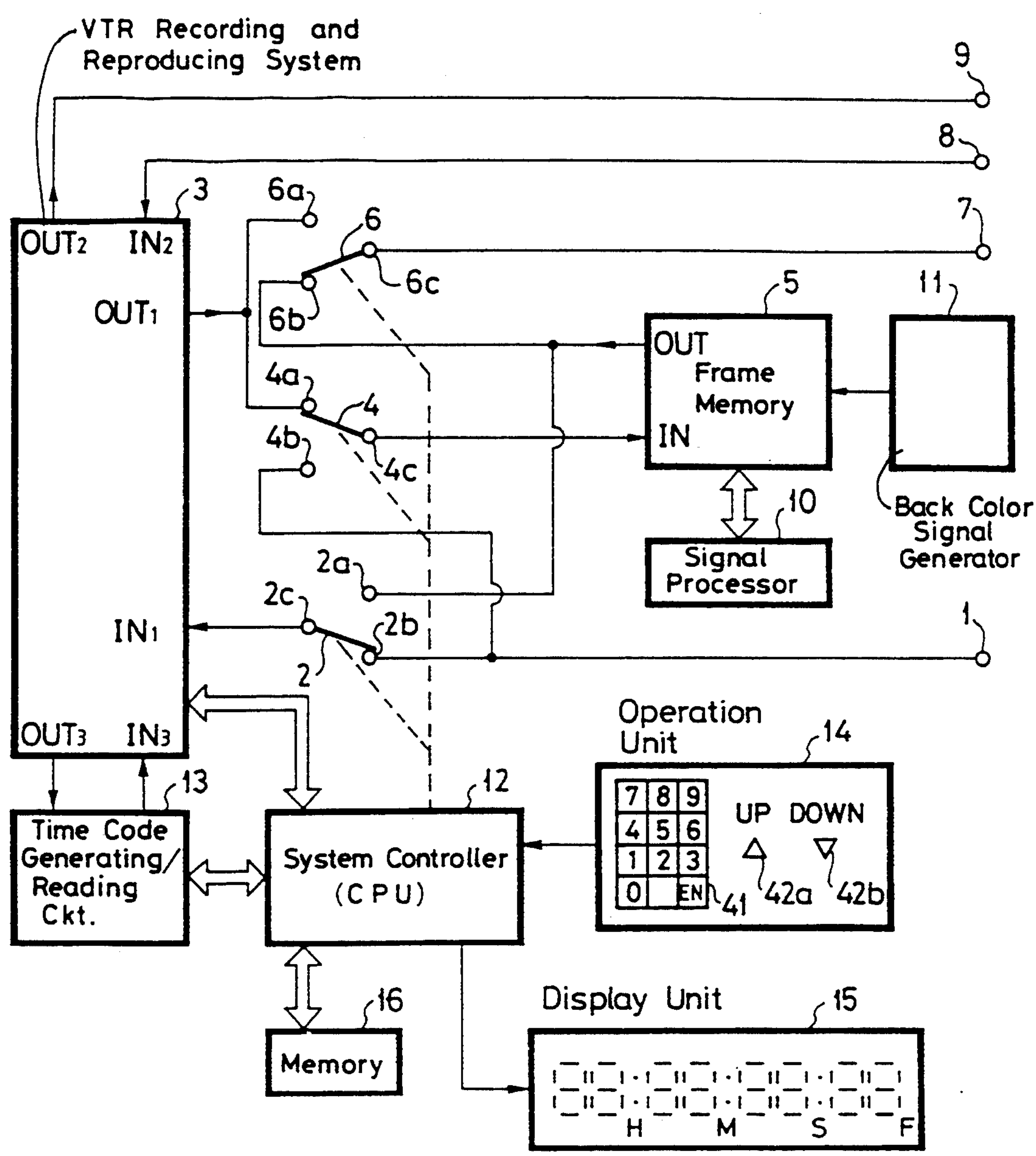
FIG. 1 is a block diagram showing a circuit arrangement of a video tape recorder according to an embodiment of the present invention.

The present invention will now be described with reference to the drawings.

FIG. 1 of the accompanying drawings shows a circuit arrangement of an embodiment of a video tape recorder according to the present invention. As shown in FIG. 1, there is provided an input terminal 1 to which a video signal is applied. The video signal applied to the input terminal 1 is supplied to one fixed contact *2b* of a first change-over switch 2. A signal developed at a movable contact *2c* of the first change-over switch 2 is supplied to an input terminal $IN_1$ of a VTR recording and reproducing system 3.

The video signal from the input terminal 1 is also supplied to one fixed contact *4b* of a second change-over switch 4. A signal developed at a movable contact *4c* of the second change-over switch 4 is supplied an input terminal IN of a frame memory 5.

A signal from an output terminal OUT of the frame memory 5 is supplied to the other fixed contact *2a* of the first change-over switch 2. Further, the signal from the output terminal OUT of the frame memory 5 is supplied to one fixed contact *6b* of a third change-over switch 6.

A signal from an output terminal $OUT_1$ of the VTR recording and reproducing system 3 is supplied to the other fixed contacts *4a*, *6a* of the second and third change-over switches 4, 6. A signal developed at a movable contact *6c* of the third change-over switch 6 is supplied to a video signal output terminal 7.

There is shown an input terminal 8 to which an audio signal (two-channel audio signal)is supplied. The audio signal applied to the input terminal 8 is supplied to an input terminal $IN_2$ of the VTR recording and reproducing system 3. A signal from an output terminal $OUT_2$ of the VTR recording and reproducing system 3 is supplied to an audio signal (two-channel audio signal) output terminal 9.

There is provided a signal processing circuit 10 that processes video signals in various ways, which will be described later on, in cooperation with the frame memory 5. Further, there is shown a background color signal generating circuit 11 which will be described later on.

There is shown a system controller circuit 12 that might be formed of a central processing unit (CPU). The CPU 12 and the VTR recording and reproducing system 3 communicate with each other to thereby effect some suitable control operation such as the control of a mechanism unit of the recording and reproducing system 3 or the like. There is shown a so-called time code generating/reading circuit 13. A time code generated by the time code generating/reading circuit 13 is supplied to an input terminal $IN_3$ of the VTR recording and reproducing system 3, and thereby being recorded on a recording medium (not shown). Also, a time code reproduced from the recording medium is read out through an output terminal $OUT_3$ of the VTR recording and reproducing system 3 by the time code generating/reading circuit 13.

The user can manually operate this video tape recorder by an operation unit 14. Data representative of operations done by the user or the like are displayed on a display unit 15 and also stored in a memory 16.

Therefore, according to this video tape recorder, when the first change-over switch 2 connects the movable contact 2*c* to the fixed contact 2*a* and the second change-over switch 4 connect the movable contact 4*c* to the fixed contact 4*b* upon recording, an input image is supplied through the frame memory 5 to the VTR recording and reproducing system 3. Then, some suitable processing of the input picture, such as time base correction, noise reduction, zooming, multi-picture or the like can be carried by a cooperation of the frame memory 5 and the signal processing circuit 10. The frame memory 5 and the signal processing circuit 10 can function as a so-called frame synchronizer. Further, the input picture can be stored at the unit of frames. Thus, when a still picture of an arbitrary frame is recorded, for example, the same picture need not be input repeatedly.

When the second change-over switch 4 connects the movable contact 4*c* to the fixed contact 4*a* and the third change-over switch 6 connects the movable contact 6*c* to the fixed contact 6*b* upon reproducing, a reproduced picture is supplied through the frame memory 5 to the video signal output terminal 7. Then, some suitable processing of the reproduced picture, such as time base correction, noise reduction, zooming, multi-picture or the like can be carried by the cooperation of the frame memory 5 and the signal processing circuit 10. Further, the reproduced picture can be stored at the unit of frames. Thus, a picture can be played back in some suitable playback mode, such as a noise-less slow playback mode in which a stored picture, for example, of an arbitrary frame can be repeatedly reproduced at variable tape speed or the like.

Further, in the recording state, the first change-over switch 2 connects the movable contact 2*c* to the fixed contact 2*a* to supply an arbitrary color signal from the background color generating circuit 11 to the VTR recording and reproducing system 3 and the time code from the time code generating/reading circuit 13 also is supplied to the VTR recording and reproducing system 3. Therefore, the time code is recorded on the recording medium (not shown) together with the arbitrary background color signal, and the recording medium that is utilized when an animation is effected, as will be described later on, can be pre-formatted.

A so-called animation in which a still picture, for example, is recorded at every arbitrary frame will be effected by using the aforesaid video tape recorder as follows:

Initially, the above-mentioned pre-formatted recording medium (not shown) is loaded onto the VTR recording and reproducing system 3. Then, the first change-over switch 2 connects the movable contact 2*c* to the fixed contact 2*a* and the second change-over switch 4 connects the movable contact 4*c* to the fixed contact 4*b*, whereby the input picture is supplied through the frame memory 5 to the VTR recording and reproducing system 3.

Then, the user sets a time code of a recording start point by operating ten keys on a ten-key pad 41 of the operation unit 14 and then sets the number of frames to be recorded by operating an up-key (increment key) 42*a* or down-key (decrement key) 42*b* of the operating unit 41. In this case, initially, the user increments the number of frames to be recorded one by one by operating the up-key 42*a*. If the number of frames is incremented too much, then the user decrements the number of frames to be recorded one by one by operating the down-key 42*b*.

Further, an arbitrary one frame of input video signal is written in the frame memory 5. One frame of the input video signal written in the frame memory 5 is supplied through the fixed contact 6*b* and the movable contact 6*c* of the third change-over switch 6 to the video output terminal 7 and thereby the user can visually confirm the same by, for example, a monitor receiver (not shown).

A time code of a recording an ending point is calculated from the time code of the starting time point and the number of frames thus set by the CPU 12. Then, the video signal written in the frame memory 5 is repeatedly read out and this video signal is recorded during a period from the recording starting time point to the recording ending time point.

After this recording is ended, the next arbitrary one frame of the input video signal is written in the frame memory 5. One frame of the input video signal written in the frame memory 5 is supplied through the fixed contact 6*b* and the movable contact 6*c* of the switch 6 to the video output terminal 7 and thereby the user can visually confirm the same by, for example, the monitor receiver (not shown).

The calculated time code of the recording ending time point by the CPU 12 is set to a time code of the next recording starting time point. Further, a time code of the next recording ending time point is calculated from this time code and the thus set number of frames by the CPU 12. Then, the video signal written in the frame memory 5 is repeatedly read out and this video signal is recorded during a period from the next recording starting time point to the next recording ending time point.

The aforesaid processings are sequentially repeated, whereby still pictures are sequentially recorded at every arbitrary frame each and hence, so-called animation is made. The number of frames that are set when the video signal is recorded may be varied by operating the up-key 42*a* or down-key 42*b* freely.

As shown in FIG. 2A, a time code representative of the first recording starting time point is detected and the recording medium is rewound in a so-called pre-roll fashion from the position at which the above time code is detected. Then, the video tape recorder is set in the standby mode at the position of the time code that is just 3 seconds before the starting timing point, for example. Then, as shown in FIG. 2B, a tape speed is fine adjusted to match the tape positions, and the video signal of the frames thus set (e.g., 2 frames) is recorded from the position of the starting timing point.

Then, as shown in FIG. 2C, the recording medium is rewound in a pre-roll fashion and the video tape recorder is set in the standby mode at the position of the time code 3 seconds before the ending timing point (i.e., the next starting timing point). A tape speed is then fine adjusted to match the tape positions and the video signal of the frames thus set is recorded from the position of the next starting timing point. Further, as shown in FIG. 2D, the recording medium is rewound in a pre-roll fashion. As a result, the video signal is recorded as shown in FIG. 2E.

As described above, according to the aforesaid video tape recorder, upon recording and reproducing, the arbitrary video signal processing such as animation or the like can be carried out by using the frame memory 5 and the time code (time code generating/reading circuit 13).

Furthermore, according to the aforesaid video tape recorder, a recording medium (not shown) on which the recording was effected, for example, is loaded onto the VTR recording and reproducing system 3. The second change-over switch 4 connects the movable contact 4c to the fixed contact 4a and the third change-over switch 6 connects the movable contact 6c to the fixed contact 6b, whereby a reproduced picture is supplied through the frame memory 5 to the video signal output terminal 7.

Then, the user sets a plurality of desired time codes by operating the ten keys on the ten-key pad 41. A plurality of time codes thus set are stored in the memory 16. A time code stored in the first address of the memory 16 is read out and a reproduced picture (one frame) of this time code is written in the frame memory 5. One frame of the reproduced picture written in the frame memory 5 is developed at the video output terminal 7 as a still picture through the third change-over switch 6.

Further, time codes stored in the preceding and succeeding addresses of the memory 16 are read out from the memory 16 by operating the Up-key 42a and the down-key 42b. That is, the time code stored in the next address of the memory 16 is read out by operating the up-key 42a and the time code stored in the preceding address of the memory 16 is read out by operating the down-key 42b.

In this fashion, the video signal recorded on the recording medium, for example, can be reproduced similarly to a so-called slide projector.

According to the present invention, upon recording and reproducing, the arbitrary video signal processing such as animation or the like can be effected by using the frame memory and the time code.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for recording a video signal comprising:

user-controlled starting point setting means enabling a user of the apparatus to set a time code representative of a recording starting point;

user-controlled frame number setting means enabling the user to set the number of frames to be recorded;

a frame memory in which an arbitrary one frame of an input video signal is recorded; and control means for calculating a time code representative of a recording ending point on the basis of the time code of said starting point set by the user and the number of frames set by the user and controlling said frame memory so that the video signal written is said frame memory is repeatedly read out and recorded during a period from the recording starting point to the recording ending point.

2. The apparatus according to claim 1 further comprising picture generating means for generating a video signal of an arbitrary fixed picture, time code generating means for generating a time code signal and control means for reformatting a recording medium by recording said video signal of fixed picture and said time code signal.

3. The apparatus according to claim 2 wherein said picture generating means generates a background color signal.

4. The apparatus according to claim 1 wherein said recording medium is a magnetic tape.

5. The apparatus according to claim 4 wherein a recording on said recording medium is carried out at every predetermined number of frames.

6. The apparatus according to claim 5 wherein said magnetic tape is rewound by a predetermined tape amount immediately after said recording.

* * * * *